Figure 1:
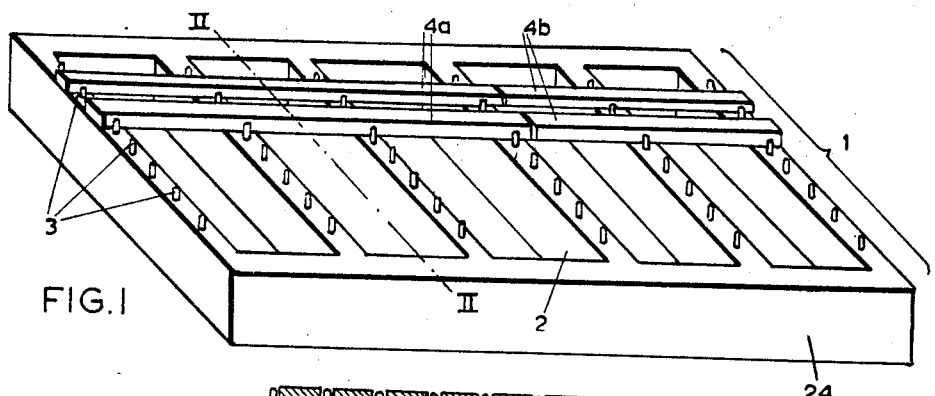

Sept. 17, 1968     B. VRIJMA     3,402,233
METHODS AND ARRANGEMENTS FOR CUTTING A MASS OF PLASTIC
MATERIAL AND BODIES PRODUCED
ACCORDING TO SAID METHODS
Filed Jan. 16, 1964     2 Sheets-Sheet 1

INVENTOR

BEREND VRIJMA

BY    *Imirie & Smiley*

ATTORNEYS

INVENTOR
BEREND VRIJMA
BY
ATTORNEYS

United States Patent Office 3,402,233
Patented Sept. 17, 1968

3,402,233
METHODS AND ARRANGEMENTS FOR CUTTING A MASS OF PLASTIC MATERIAL AND BODIES PRODUCED ACCORDING TO SAID METHODS
Berend Vrijma, Vuren aan den Waal, Netherlands, assignor to Fabriek van Bouwmaterialen "Loevestein" N.V., a company of the Netherlands
Filed Jan. 16, 1964, Ser. No. 338,193
Claims priority, application Netherlands, Jan. 16, 1963, 287,814, 287,815
16 Claims. (Cl. 264—157)

The invention relates to a method for cutting a mass of plastic material, more especially of lightweight concrete, consisting of laying a number of bars spaced apart from each other on a support, supporting said mass to be cut by means of said bars, and moving at least one cutting wire relatively to and between two of said bars, said cutting wire extending below and above the surface supporting said mass from an under to an upper tightening member.

In a known method the under tightening member is moved within a groove formed by two of a number of T-profiled bars welded to a support. The operation of guiding the under end of the wire is achieved by guiding the under tightening member within the groove. The fact that the grooves can become clogged, resulting in jamming of the under tightening member, is a serious disadvantage of this known method as the grooves cannot be cleaned easily. The known method is not suitable at all for cutting light weight concrete in plastic or semi-plastic condition as the support carrying T-profiled bars and mass must be put into and out of a hardening boiler each time the support is used for manufacturing bodies of light weight concrete or a like material. The T-profiled bars welded to the support will warp in consequence of the reheating and recooling, resulting in the guide of the cutting wire being warped, the plates being cut incorrectly and/or a jamming of the under tightening member. In the hardening boiler also plastic material gathered in said grooves will harden. The grooves must be cleaned carefully to prevent jamming of the under tightening member. On the other hand cleaning the grooves of hardened light weight concrete is very difficult and expensive.

The cost of acquisition of the known arrangement is rather high by reason of the fact that exactly machined T-profiled bars are needed and exact and difficult welding is required. In the above method for cutting, the pitch distance between two adjacent grooves is relatively large. It should be noted that by application of the above method and one and the same arrangement plates having thicknesses varying with the module, i.e. the fixed pitch distance between two adjacent grooves, only can be produced. As a consequence of the large pitch distance heretofore mentioned only relatively large variations in plate thicknesses can be obtained.

The above mentioned disadvantages of the known method of cutting are avoided and a plurality of advantages are obtained as a result of the invention by causing the bars to lie loosely on the support and loosely from each other.

The invention renders it possible to use the same arrangement for producing plates having thickness varying with a very short module. To that end the invention provides a method enabling to use rectangularly profiled bars against the T-profiled bars prescribed by the known method.

Two adjacent bars can have a simple rectangular profile presenting a thickness of for instance 5 mm. Two adjacent grooves can have a pitch distance of 10 mm. or even less. The small cross section of the bars is allowable, as the mass to be cut can be well supported by supporting the bars and thus the mass on a rigid support. On the other hand the bars can be manipulated together with the mass to free the path for the under tightening member, for instance by passing a number of supporting members through said support and lifting said bars relatively to said support by means of said supporting members, or by mounting a number of rollers in bearings, supporting said bars by means of said rollers and moving said bars along their longitudinal axes transversely to said rollers. As a result of the invention a continuous transport and an easy method of cutting are obtained. The process of cutting can be carried out by placing a rigid cutting frame including one under and one upper tightening member, in the path of the mass being rolled from an earlier operating station to the hardening boiler. Both said tightening members can tighten a number of cutting wires. The position of the cutting wires in relation to each other is defined exactly by joining each wire at exact distance to the tightening members of the rigid cutting frame. The bars laying loosely on the support do not tend to warp by reheating and recooling. For that reason the bars do not need to be machined as they do not serve as guides for an under tightening member or cutting wires.

By reason of the fact that all wires extending in a horizontal as well as those extending in a vertical direction can be tightened in the same rigid cutting frame measures of the bodies produced by the method of cutting according to the invention are defined extremely precisely.

The arrangement can be applied for cutting bodies with quite different dimensions by laying the bars spaced apart over other distances. By omitting that particular bar lying in the path of a cutting wire, even a plate of any desired thickness can be cut.

The arrangement including rectangularly profiled bars lying loosely on a support leads to relatively cheap acquisition costs. The support with bars according to the invention can be cleaned easily.

The plastic mass supported by the bars keeps the bars spaced apart. However, in order to prevent the bars from moving transversely to the support when not supporting said mass the bars are laid upon the cross-beams preferably between extensions or in grooves of said cross-beams.

A further object of the invention is to provide a method of cutting of the kind described, in which the bars are laid on a number of cross beams, and in which the cutting wire is held taut between an under and an upper tightening member. The tightening members and said cutting wire are moved in the longitudinal direction of said bars and said cross beams are lowered succesively for enabling said under tightening member to pass between said cross beams and said bars while the plastic mass is maintained in contact along its whole length with said bars during cutting.

Figure 2:
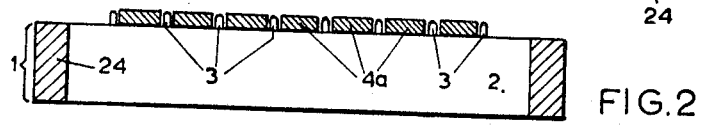
Figure 3:
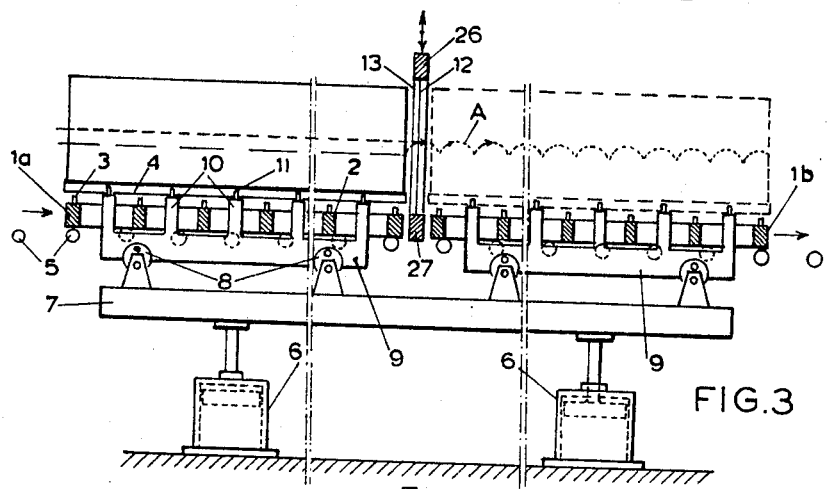
Figure 4:
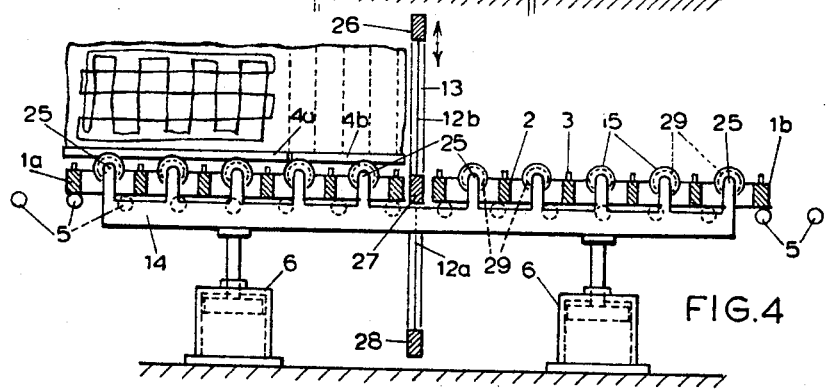
Figure 5:
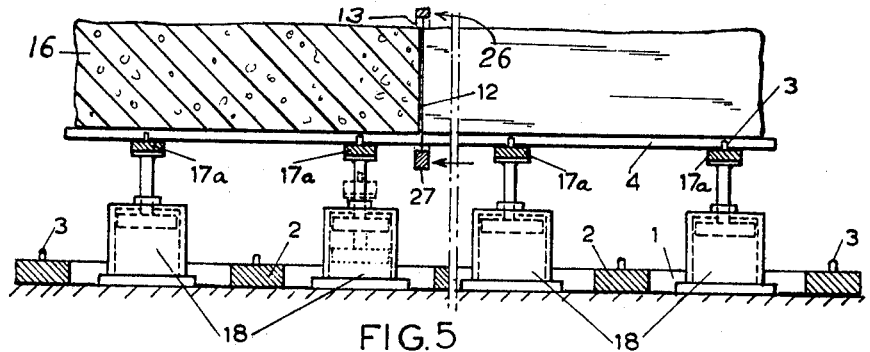
Figures 6, 7:
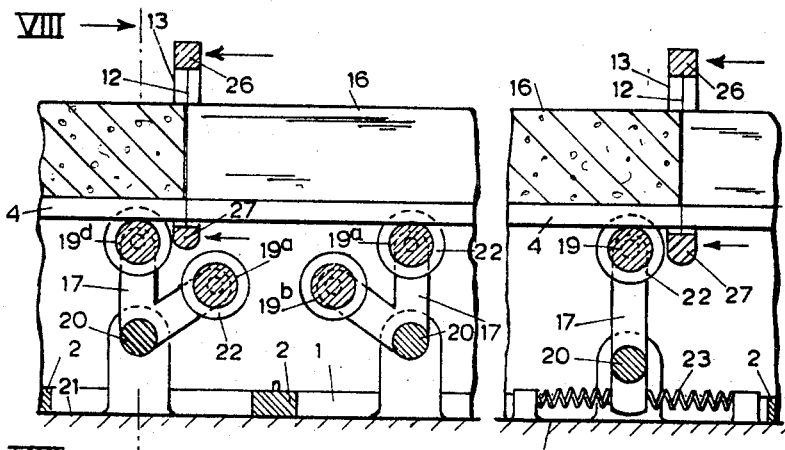
Figure 8:
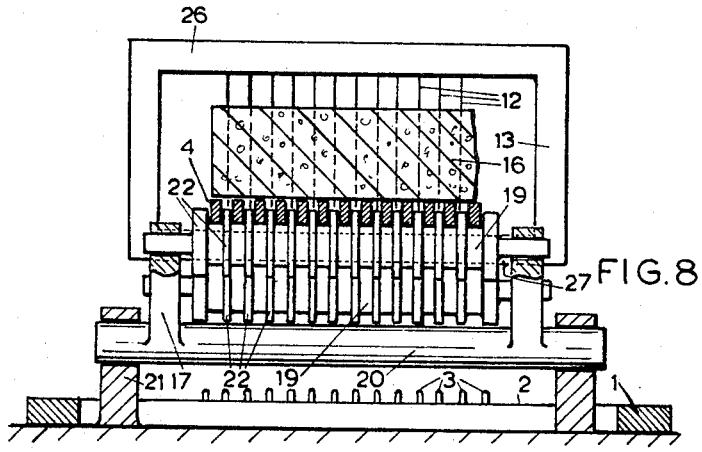

The above and other characteristics of the invention will be hereinafter described in detail with reference to the drawing, wherein:

FIG. 1 a perspective view of a support in the form of a grating supporting bars only two of said bars being shown, FIG. 2 a cross section according to the line II—II of FIG. 1, FIG. 3 a longitudinal section of an arrangement according to the invention, FIG. 4 a longitudinal section of another arrangement according to the invention, FIG. 5 a longitudinal section of still another arrangement according to the invention, FIGS. 6 and 7 a part of an arrangement substantially according to the arrangement of FIG. 5 however with a first and a second improvement respectively, and FIG. 8 a cross section according to the line VIII—VIII of FIG. 7.

The support 1 or pallet shown in FIG. 1 which consists of two longitudinal beams 24 and a number of cross-beams 2 lying parallel to each other in the same plane forms the support for the bars 4. The bars 4 may be divided into two or more coaxially extending parts 4a and 4b. On the cross beams 2 projections 3 for instance formed by pins, are provided. Said projections keep the bars spaced apart over a particular distance. Preferably said projections 3 are chamfered or rounded at their tops 25 for causing each of said bars 4 to enter easily between two adjacent projections 3. The cross-beams 2 can be provided with grooves instead of said projections 3, said grooves receiving bars 4.

The support 1 can be supplied to the cutting machine of FIG. 3 or 4 over a track formed by rollers 5. The cutting machine, shown in FIG. 3 comprises a frame 7, a cutting frame 13, a number of lifting devices 6 for lifting and lowering the frame 7 and a number of driving mechanisms 8, for instance excentric mechanisms, two additional frames 9 being driven and supported by the driving mechanisms 8. The additional frames 9 are shaped as broad combs provided with teeth 10 constituting supporting members for supporting the bars 4, together with the mass when the frame 7 is lifted by the lifting devices 6. The teeth 10 are provided with projections 11 for receiving the bars 4 between them.

Prior to a cutting operation a support 1b is placed at the discharge end of the cutting machine (in FIG. 3 on the right side of the cutting frame 13), whereas at the feeding end of the cutting machine (left side of FIG. 3) a support 1a provided with a number of bars 4 carrying a block of plastic material to be longitudinally cut is fed into the cutting machine over rollers 5, the frame 7 together with the additional frames 9 being lowered out of the path of the support 1a prior to said feeding operation. During a cutting operation the frame 7 and the additional frames 9 are lifted to such a level as to enable the supporting members 10 to take over the bars 4 together with the mass which now are periodically lifted or separated from supports 1a and horizontally moved along the path indicated by A. To that aim the additional frames 9 are driven by the driving mechanisms 8. As the cutting frame is slid in the path of the mass and of the bars 4 the mass is cut in longitudinal direction by the cutting wires 12 tightened between the upper tightening member 26 and the under tightening member 27, as the mass is being moved from the feeding end, through the cutting frame towards the discharge end of the machine while the mass is maintained in contact along its whole length with the bars during cutting (note FIGS. 3 to 7). After the cutting operation is finished the frame 7 together with the additional frames 9 is lowered to enable the support 1b together with the bars 4 and the cut mass to be discharged from the machine and supplied to a hardening boiler, not shown. The support 1a can be rolled from the feeding end to the discharge end of the machine when the cutting frame 13 is slid out of the path of said support. After another support 1a carrying bars 4 and a mass to be cut has been supplied to the machine and the cutting frame 13 has slid back to its operating position another cutting process can be carried out again. The cutting frame 13 is preferably slidably mounted in guides not shown. Said guides can keep the cutting frame in a fixed position during the cutting process.

The cutting machine shown in FIG. 4 comprises a cutting frame 13, a frame 14 and a number of lifting devices 6 for lifting and lowering the frame 14. The frame 14 is provided with a number of supporting members formed by rollers 15, each roller 15 being rotatably mounted in bearings 25. In FIG. 4 only 10 rollers 15 are shown. In practice, however, it is advantageous to employ 20 or more of said rollers.

In each of a number of longitudinal vertical planes each roller 15 is provided with an annular projection 20 so as to enable each bar 4 to be laid between a number of pairs of said projections 29.

If the bars 4 are divided in two coaxially extending parts 4a and 4b the mass carried by the parts 4b is displaceable in longitudinal direction relatively to the mass carried by the parts 4b, provided the mass is cut already transversely in the region of the dividing plane of bars 4.

The cutting machine shown in FIG. 4 is provided with a cutting frame 13 having cutting wires 12a and 12b, the latter ones being spaced apart over a larger distance than the cutting wires 12a. The cutting wires 12b are tightened between tightening members 26 and 27, whereas cutting wires 12a are tightened between tightening members 27 and 28. The inner width of the frame 14 is less than the outer width of the cutting frame 13 to enable the latter to be slid out of the path of the support, rolling over rollers 15.

Lowering frame 14 and sliding cutting frame 13 out of the path of the supports 1 prior to a rolling operation enable the supports 1 to be rolled in the region of the machine and enables the following operations to be carried out:

A support 1b is rolled to the discharge end without any bar or mass upon it;

A support 1a carrying a number of bars 4a and 4b supporting a mass cut transversely already, as indicated with dotted lines, is fed into the cutting machine at the feeding end;

Frame 14 is lifted for taking over bars 4 and mass from the support 1a;

Cutting wires 12b are put in the path of the mass to be cut;

The mass carried by the bars 4b is rolled over rollers 15 to the discharge end of the machine, during which latter rolling operation it is cut into blocks the thicknesses of which correspond to the distance between two adjacent cutting wires 12b while the mass is maintained in continuous contact along its whole length with the bars during cutting; with the removal of cutting wires 12b cutting wires 12a are put into the path of mass and bars;

The mass to be cut into plates with thicknesses corresponding to the distances between two adjacent wires 12b and carried by bars 4a is rolled over rollers 15 to the discharge end of the machine; frame 14 is lowered for causing the bars 4 together with the cut mass to be taken over by or returned to support 1b;

Support 1b together with bars 4 and cut mass is discharged from the machine;

Cutting frame 13 is slid out of the path of support 1a;

Support 1a is rolled to the discharge end;

Another mass to be cut in longitudinal direction can be supplied to the feeding end of the machine and, after having been treated in the above described way, can be discharged in turn from the machine by means of the support 1a. During rolling operation the mass can be driven by driving the rollers 15 or by pushing against the mass or bars 4 in the direction of the discharge end.

To prevent any transverse displacement of the bars 4 they are always lying either in grooves formed by projections 3 or in grooves formed by projections 29. It can be easily understood that by having the projections 3 and 29 in the same planes the frame 14 can take over the bars 4 from the support 1a at the feeding end of the machine, when lifted, and can transmit the bars 4 to the support 1b at the discharge end, when lowered.

The cutting wires 12 can be placed in all longitudinal planes in which no bar 4 is present.

It should be noted that cutting is also possible by means of a cutting machine having rotatable rollers, like rollers 15, being mounted on a level flush with the rollers of the cutting machine, in which case the mass is fed through the machine, sustained by bars 4 solely. In the latter method of cutting the supports 1 are absent. The cutting machine according to FIG. 5 comprises a number of lifting devices 18 spaced apart in a longitudinal direction, a cutting frame 13 guided in said longitudinal direction in guides not shown and a number of cross beams 17a. Each of said cross beams 17a can be lowered and lifted by a lifting device 18. A mass to be cut can be held above the cutting machine of FIG. 5 with the aid of a support 1 and bars 4 according to FIGS. 1 and 2, for instance by means of a movable crane or by means of rollers as rollers 5 not shown in FIG. 5. When the cross beams 2 of the support 1 are placed in longitudinal direction between the cross beams 17a and the projections 3 of cross beams 17a and 2 are extending in the same planes the cross beams 17a, when lifted, can take over the bars 4 from the support 1. During the cutting process the support 1 can rest, for instance on the ground or on the above mentioned rollers not shown in FIG. 5, respectively, until the cutting operation has been finished. Cutting is achieved by moving the cutting frame 13 with cutting wires 12 in longitudinal direction of the mass and lowering the cross beams 17a successively for enabling the under tightening member 27 of the cutting frame to pass between the cross beams 17a and bars 4.

The cut mass 16 is discharged from the machine lifting the support 1 relatively to the cross beams 17a with the aid of a movable crane or by lowering the cross beams 17a until the bars 4 are supported by the support which can be rolled out of the machine over said rollers not shown.

Instead of a support having cross beams 2 which are indismountably secured to it a support having dismountable cross beams 17a can be used. In the latter case, prior to a cutting process, the dismountable support is supplied to a cutting machine not including cross beams 17a so that the cross beams are held above the lifting devices 18. After the lifting devices are raised and when they support the cross beams 17a the longitudinal beams of the dismountable support are loosened from said cross beams 17a to enable the latter ones to be lowered separately and successively by their lifting devices 18 in order to free the path for the under tightening member 27 of the cutting frame 13.

The cross beams 17a should be spaced apart over such a distance as to prevent inadmissible sagging of the bars 4. On the other hand the bars 4 may have small cross sections as they are rigidly supported, thus enabling the cutting wires 12 passing between two adjacent bars to be placed at very short pitch distances, as a result of which plates having thicknesses varying with a very short module can be produced with the aid of one and the same cutting machine and the same supports 1.

Instead of cross beams 17a each being lowered and lifted separately by a lifting device 18 bearers 17 as shown in FIGS. 6 and 7 can be used. The cutting machines, according to FIGS. 6 and 7 each comprise a cutting frame 13 comparable with the cutting frame 13 of FIG. 5 and a number of bearers 17 spaced apart and swingable about an axis 20 rotatably mounted in a frame 21. The bearers 17 of FIGS. 6 and 7 comprise one and two rollers 19, respectively. Prior to a cutting process each bearer 17 supports all bars 4 by means of one roller 19. Each mentioned roller has a number of annular projections 22, such projection 22 of all rollers 19 of the same machine lying in one of a number of longitudinal vertical planes. The bearer 17 of FIG. 6 is pressed into the supporting position by pressure springs 23 or 21. However, the springs 23 and 21 are not attached to the bearers 17 and do not exert a pressure on them, when they are in a swung clockwise and a counter clockwise direction, respectively. During the cutting operation the under tightening member 27, of cutting frame 13 of FIG. 6 moving to the left in the drawing pushes against the rollers 19 successively and causes them to go out of the way of said member. The spring 23 is compressed during the counter clockwise swinging of the bearer 17 and is able to push the bearer 17 back into its supporting position when the under tightening member 27 has passed between the roller 19 and the bars 4.

The bearers 17 of FIG. 7 have two supporting members 19 angularly displaced from each other. During the cutting operation the under tightening member 27 pushes against the supporting roller 19d to remove it out of the path of said member 27. However, when the roller 19d is swung out of its supporting position in front of the under tightening member the roller 19a forming part of the same bearer as roller 19d is caused in turn to take the supporting position after the under tightening member 27 has passed between the bearer 17 and the bars 4. At the end of the cutting operation all bearers 17 present one supporting member 19 in an upright position and the other supporting member 19 in a position indicated by the supporting member 19b.

Each bearer 17 can be provided with a catch mechanism not shown keeping the bearer fixed in a position in which a supporting member 19 supports the bars 4, said catch mechanism being releasable against spring force by said under tightening member 27.

In FIG. 8, 12 cutting wires 12 extending between each two adjacent bars 4 and only 13 of said bars are shown. In practice, however, a number of about 100 bars 4 per transversely extending meter can be provided. For each centimeter a cutting wire can be provided. This means a pitch distance of 1 cm. and also a module of 1 cm. for the plate thicknesses to be obtained by means of the invented cutting arrangement. Fundamentally, any plate thickness can be out, provided that any bar lying in the path of a cutting wire is omitted.

Of course all above cutting frames 13 can also be provided with horizontally extending cutting wires.

What I claim is:

1. In a method of cutting a mass of plastic material such as light weight concrete, the improvement which comprises, providing a plurality of spaced-apart bars running in the direction of their longitudinal axes, loosely supporting said bars by a plurality of spaced-apart supports arranged transversely to said bars so that said bars lie loosely across said supports, placing said plastic mass to be cut on said bars, providing at least one cutting wire held in tension by upper and lower tightening members, said at least one wire being arranged to pass through a space between a pair of said bars, causing said bars and supported mass on the one hand to move freely relative to said cutting wire on the other hand so that said wire passes longitudinally through said space and cuts through said mass while the mass is continuously maintained in contact along its whole length with said bars during cutting.

2. In a method of cutting a mass of plastic material such as light weight concrete, the improvement which comprises providing a plurality of spaced-apart bars running in the direction of their longitudinal axes, supporting said bars by a plurality of spaced-apart supports arranged transversely to said bars so that said bars lie loosely across said supports, placing said plastic mass to be cut on said bars, providing at least one cutting wire held in tension by upper and lower tightening members, said at least one wire being arranged to pass through a space between a pair of said bars, lifting said bars and said mass from said plurality of spaced-apart supports by a set of support members arranged to allow cutting of said mass, causing said bars and supported mass on the one hand to move horizontally relative to said cutting wire on the other hand so that said wire passes longitudinally through said space and cuts through said mass while the mass is continuously maintained in contact along its whole length with said bars during cutting, and then returning said bars to said plurality of spaced-apart supports.

3. The method of claim 2 wherein the bars are lifted from the supports during cutting while the bars continuously support the whole length of said mass by causing each of the support members to be lowered successively from the bars as the cutting wire passes through the mass uninterruptedly.

4. An arrangement for cutting a mass of plastic material such as light weight concrete which comprises, a plurality of supports spaced substantially parallel to each other in a plane, said supports extending in the same direction, a plurality of spaced-apart bars loosely supported between their ends by said supports in said plane, said bars lying side by side in a direction along their longitudinal axes transverse to the direction of said supports, a cutting station associated with said supports and bars comprising a pair of upper and lower spaced-apart tightening members having connected therebetween under tension at least one cutting wire, with the lower tightening member adapted to move below the plane of said bars and with the upper tightening member high enough to allow a plastic mass supported along its whole length by said bars to pass between said tightening members to enable the cutting thereof by said at least one wire passing through the space between two of said bars, means for separating said bars with the supported mass from the supports so that said cutting wire can pass through said mass, and means for causing relative movement between the bars supporting the mass and the cutting station in the longitudinal direction of the bars, whereby to effect cutting of said mass while said mass is maintained in continuous contact along its whole length with said bars during cutting.

5. An arrangement for cutting a mass of plastic material such as light weight concrete which comprises, a plurality of supports spaced substantially parallel to each other in a plane, said supports extending in the same direction, a plurality of spaced-apart bars loosely supported between their ends by said supports in said plane, said bars lying side by side in a direction along their longitudinal axes transverse to the direction of said supports, a cutting station forward of said bars comprising a pair of upper and lower spaced-apart tightening members having connected therebetween at least one cutting wire held under tension, said lower tension members being adapted to move below the plane of said bars, the upper tightening member being high enough to allow a plastic mass supported by said bars to pass between said tightening members to enable cutting thereof by said wire passing through the space between two of said bars, means for separating said bars with the supported mass from the support so that said cutting wire can pass through said mass, and means for causing relative movement between said bars with plastic mass supported thereon and the at least one cutting wire, whereby the bars and supported mass are caused to move towards and past the cutting station with the cutting wire passing between the bars, while said mass is maintained in continuous contact along its whole length with said bars during cutting.

6. The arrangement of claim 5 wherein at least one of said plurality of supports is a roller mounted for rotation.

7. The arrangement of claim 6, wherein said plurality of supports are all rollers disposed transverse to the direction of movement of said bars supported thereon, each of said rollers being mounted for rotation.

8. The arrangement according to claim 5, including a pallet having a plurality of cross beams comprising said supports for supporting said bars, said pallet and said bars being capable of being lowered or raised relative to each other between a first position in which the mass and the bars are supported by means of said pallet and a second position in which the mass and bars are supported by said means which separate the bars from the pallet.

9. An arrangement for cutting a mass of plastic material such as light weight concrete which comprises, providing a plurality of spaced apart cross beams disposed substantially parallel to each other in a plane, each of said cross beams being capable of being successively lowered and raised, a plurality of spaced apart bars supported between their ends across said cross beams, said bars extending in the direction of their longitudinal axes towards a cutting station, a cutting station forward of said bars comprising a pair of upper and lower spaced-apart tightening members having connected therebetween at least one cutting wire held under tension, the upper tightening member being arranged above said bars and the lower tightening member being arranged below said bars, said at least one cutting wire passing between two of said bars such that a mass placed on the bars can be cut by a movement of said bars, cross beams and the supported mass relative to said wire, and means for effecting said relative movement, said means including means for lowering the cross beams successively while the remaining cross beams support the bars between their ends to enable the lower tightening member of the cutting station to pass successively between the support members and said bars and cut through said mass, while said mass is maintained in continuous contact along its whole length with said bars during cutting.

10. The arrangement according to claim 5, characterized in that at least one of said supports comprises a plurality of projections each extending between two of said bars.

11. The arrangement according to claim 6 characterized in that said roller comprises a plurality of annular projections each extending between two of said bars.

12. The arrangement according to claim 5 characterized in that all of said plurality of supports have a plurality of projections in planes extending between two of said bars.

13. The arrangement according to claim 7, characterized in that all of said plurality of rollers have a plurality of annular projections in planes extending between two of said bars.

14. The arrangement according to claim 9 characterized in that at least one of the cross beams is provided with a spring forcing said cross beam into the position in which it supports the bars.

15. The arrangement according to claim 9, characterized in that at least one of said cross beams is swingable about an axis extending in a direction parallel to said beam.

16. The arrangement according to claim 9 characterized in that said cross beam is driven by the lower tightening member out of the path of travel of the lower tightening member.

References Cited

UNITED STATES PATENTS

| | | | |
|---|---|---|---|
| 3,225,412 | 12/1965 | Widell et al. | 25—108 |
| 2,694,846 | 11/1954 | Olsson et al. | 25—105 |
| 3,075,271 | 1/1963 | Goransson | 25—108 |
| 3,088,186 | 5/1963 | Mennitt | 25—112 |
| 3,173,185 | 3/1965 | Bergling | 25—107 X |
| 3,204,315 | 9/1965 | Akerfors | 25—105 |

FOREIGN PATENTS 801,936   9/1958   Great Britain.

ROBERT F. WHITE, *Primary Examiner.*

S. I. LANDSMAN, *Assistant Examiner.*